(12) United States Patent
Huang et al.

(10) Patent No.: US 6,399,714 B1
(45) Date of Patent: Jun. 4, 2002

(54) CROSSLINKED POLYAMIDE

(75) Inventors: Zhi H. Huang, East Lansing, MI (US); William F. McDonald, Utica, OH (US); Stacy C. Wright, Lansing; Andrew C. Taylor, Ann Arbor, both of MI (US)

(73) Assignee: Michigan Biotechnology Institute, Lansing, MI (US)

( * ) Notice: Subject to any disclaimer, the term of this patent is extended or adjusted under 35 U.S.C. 154(b) by 46 days.

(21) Appl. No.: 09/671,784

(22) Filed: Sep. 27, 2000

(51) Int. Cl.$^7$ .............................................. C08G 63/91
(52) U.S. Cl. ................. 525/415; 428/474.4; 428/479.3; 428/523; 428/423.5; 428/447; 428/422
(58) Field of Search ....................... 525/415; 428/474.4, 428/479.3, 523, 423.5, 447, 422

(56) References Cited

U.S. PATENT DOCUMENTS

| | | | |
|---|---|---|---|
| 3,729,516 A | 4/1973 | Stockel et al. | 260/605.5 P |
| 4,092,443 A | 5/1978 | Green | 427/53 |
| 4,326,532 A | 4/1982 | Hammar | 128/349 R |
| 4,865,870 A | 9/1989 | Hu et al. | 427/2 |
| 4,889,596 A | 12/1989 | Schoggen et al. | 162/157.6 |

FOREIGN PATENT DOCUMENTS

WO　　WO 00/17254　　3/2000

*Primary Examiner*—James J. Seidleck
*Assistant Examiner*—Melanie Bagwell-Bissett
(74) *Attorney, Agent, or Firm*—Quarles & Brady LLP (57) ABSTRACT

A crosslinked polyamide material and a process for preparing the crosslinked polyamide material are disclosed. The crosslinked polyamide material comprises a crosslinked chemical combination of (1) a polyamide of the formula:

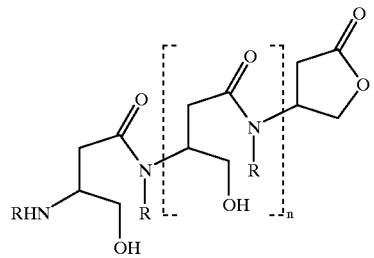

wherein n is between about 50 and 10,000, wherein each R is between 1 and 50 carbon atoms alone and is optionally substituted with heteroatoms, oxygen, nitrogen, sulfur, or phosphorus and combinations thereof, wherein multiple of the R are in vertically aligned spaced relationship along a backbone forming the polyamide, and wherein two or more of the R contain an amino group; and (2) a crosslinking agent containing at least two functional groups capable of reacting with the amino groups of the polyamide. In one embodiment of the invention, the crosslinking agent is an aliphatic or aromatic isocyanate compound having 2 or more —N=C=O groups. In another embodiment of the invention, the crosslinking agent is an aliphatic aldehyde or aromatic aldehyde compound having 2 or more —CHO groups. In still another embodiment of the invention, the crosslinking agent is selected from a phosphine having the general formula $(A)_2P(B)$ and mixtures thereof, wherein A is hydroxyalkyl, and B is hydroxyalkyl, alkyl, or aryl. In yet another embodiment of the invention, the crosslinking agent is selected from the group consisting of epoxy resins having more than one epoxide group per molecule.

36 Claims, 2 Drawing Sheets

CROSSLINKED POLYAMIDE

BACKGROUND OF THE INVENTION

1. Field of the Invention

This invention relates to a crosslinked polyamide prepared by reacting a crosslinking agent with a polyamide synthesized from an amine, a polyamine, and an unsaturated lactone. Among other things, the crosslinked polyamide is useful as a coating for a substrate, and is particularly useful in medical applications as a substrate coating that accepts an overcoat of an antithrombotic agent.

2. Description of the Related Art

It is well known that the physical properties of an organic polymeric material can be altered by introducing specific functional groups into the polymer backbone. For instance, polymeric materials that can conduct electricity, that are magnetic, or that change some property such as color or refractive index under the influence of various external factors such as light, pressure, electric fields, magnetic field, pH changes, or temperature alterations have been prepared by adding functional groups to the polymer backbone. In all of these applications, one critical requirement is that some of the functional groups along the polymer backbone be aligned in a regular repeating fashion with very high density. Polymeric materials with very different properties can be made depending on the choice of the functional groups. Electron donor-acceptor pairs can be conductive or have optical properties that are influenced by electric or magnetic fields. An array of negatively charged groups is a typical arrangement sought for conducting organic polymers where the charge carriers are metal ions and protons. Hydrogels can be formed if charges are present. Materials with special conductive, magnetic or electro-optical properties can be fabricated from polymers having specialized aromatic main or side chains.

In the background section of PCT International Publication Number WO 00/17254, several methods for introducing side chains to a main chain of a polymer are discussed and critiqued. For instance, it is reported in this document that one strategy for introducing side chains to a main chain of a polymer is to add the side chains to the preformed main chain. It is noted however, that this is generally not satisfactory because of the lack of predictability and reproducibility of stoichiometry, under-derivitization for stearic reasons, difficulty in accessing the interior of the polymer, poor solubility of the polymer, and inefficient coupling reactions. It further reported in WO 00/17254 that an alternative method for introducing side chains to a main chain of a polymer is to attach the desired side chain to each monomer prior to polymer chain formation. It is stated that this method is generally more efficient but the subsequent coupling of the monomers often requires activating groups to be attached to one or both coupling sites.

WO 00/17254 provides one solution to the aforementioned problems associated with introducing side chains to a main chain of a polymer. In WO 00/17254, there is disclosed a process for synthesizing a novel polyamide from unsaturated lactones and amines. In the polymerization reaction, the condensation of an unsaturated lactone with a variety of monofunctional, bifunctional or polyfunctional amines is initiated by a Michael reaction and is followed by ring opening of the resulting substituted lactone to give a polyamide. The resulting polyamide has a regular, sequential alignment of side chains along the polyamide backbone. The polymerization process can produce cationic, anionic or neutral polymers depending on the nature of the side chain attached to the main chain of the polymer. It is reported that the side chains can be among other things: a very long alkyl chain which generates a bipolar structure; a molecular system with special electrical properties; a polyamine with metal complexation properties; or a carboxylate with cation exchange or capture properties. The disclosed process provides a good general method for the assembly of a continuous array of side chains along a polymer backbone in a quick and efficient manner, does not require activation of groups of the monomer, does not produce any by products that have to be eliminated, proceeds under mild conditions, is compatible with a large spectrum of functional groups including alcohols, acids, phosphate groups, sulfonates, nitrites, amides and amines, can be carried out in a wide variety of solvents from aprotic solvents to water, and uses renewable resources instead of materials derived from fossil fuels.

While the polymerization process described in WO 00/17254 provides one solution to the aforementioned problems associated with known methods for introducing side chains to a main chain of a polymer, there is one disadvantage with the polyamide produced by the process of WO 00/17254. Specifically, it has been discovered that in certain coating applications, such as the use of the polyamide as a non-thrombogenic coating for surfaces which contact blood in medical applications (see, for example, Example 26 of WO 00/17254), the polyamide forms a soft waxy coating on the substrate being coated. This soft waxy polyamide coating has a tendency to be partially or totally removed from the substrate when contacted with aqueous medium and with certain solvents. The coating may become completely displaced from the surface of the substrate being coated. In medical applications where complete coverage of the underlying substrate is critical (e.g., applications where the substrate surface contacts blood), a coating prepared using the polyamide disclosed in WO 00/17254 may not be acceptable.

Therefore, there is a need for a process for improving the physical properties of the class of polyamides disclosed in WO 00/17254 such that the polyamides adhere more reliably to substrate surfaces. Also, there is a need for a polyamide having improved physical properties compared to the class of polyamides disclosed in WO 00/17254.

SUMMARY OF THE INVENTION

The foregoing needs in the art are met by a polyamide material comprising a crosslinked chemical combination of (1) a polyamide of the formula:

wherein n is between about 50 and 10,000, wherein each R is between 1 and 50 carbon atoms alone and is optionally substituted with heteroatoms, oxygen, nitrogen, sulfur, or phosphorus and combinations thereof, wherein multiples of the R are in vertically aligned spaced relationship along a backbone forming the polyamide, and wherein two or more of the R contain an amino group; and (2) a crosslinking agent containing at least two functional groups capable of reacting with the amino groups of the polyamide. In one embodiment of the invention, the crosslinking agent is selected from the group consisting of aliphatic isocyanate compounds having 2 or more —N=C=O groups, aromatic isocyanate compounds having 2 or more —N=C=O groups, and mixtures thereof. In another embodiment of the invention, the crosslinking agent is selected from the group consisting of aliphatic aldehyde compounds having 2 or more —CHO groups, aromatic aldehyde compounds having 2 or more —CHO groups, and mixtures thereof. In still another embodiment of the invention, the crosslinking agent is selected from the group consisting of phosphines having the general formula $(A)_2P(B)$ and mixtures thereof, wherein A is hydroxyalkyl, and B is hydroxyalkyl, alkyl, or aryl. In yet another embodiment of the invention, the crosslinking agent is selected from the group consisting of epoxy resins having more than one epoxide group per molecule, and mixtures thereof.

A crosslinked polyamide in accordance with the present invention provides improved physical properties over the polyamides disclosed in WO 00/17254. The crosslinked polyamide also has many practical applications. For example, the crosslinked polyamide is particularly useful as a coating for a substrate. In one coating application, the crosslinked polyamide is used to coat a polymeric substrate which may comprise a natural polymer such as cellulose, or a synthetic polymer such as polyethylene, polypropylene, polyvinyl chloride, polyurethane, silicone rubber or polytetrafluoroethylene. In another coating application, an antithrombotic agent (i.e., a material that inhibits thrombus formation), such as heparin, is bonded to the crosslinked polyamide coating to produce an article suitable for medical applications in which the article contacts blood. (As used herein, "antithrombotic" and "non-thrombogenic" refer to any material which inhibits thrombus formation on a surface.) In yet another coating application, the crosslinked polyamide is used to coat surfaces in order to suppress biofilm formation. In still another coating application, the crosslinked polyamide is used as a thin conductive film for electronic devices. Additionally, the crosslinked polyamide may be used to coat oil and gas lines.

These and other features, aspects, and advantages of the present invention will become better understood upon consideration of the following detailed description, drawings, and appended claims.

DETAILED DESCRIPTION OF THE INVENTION

Figure 1:
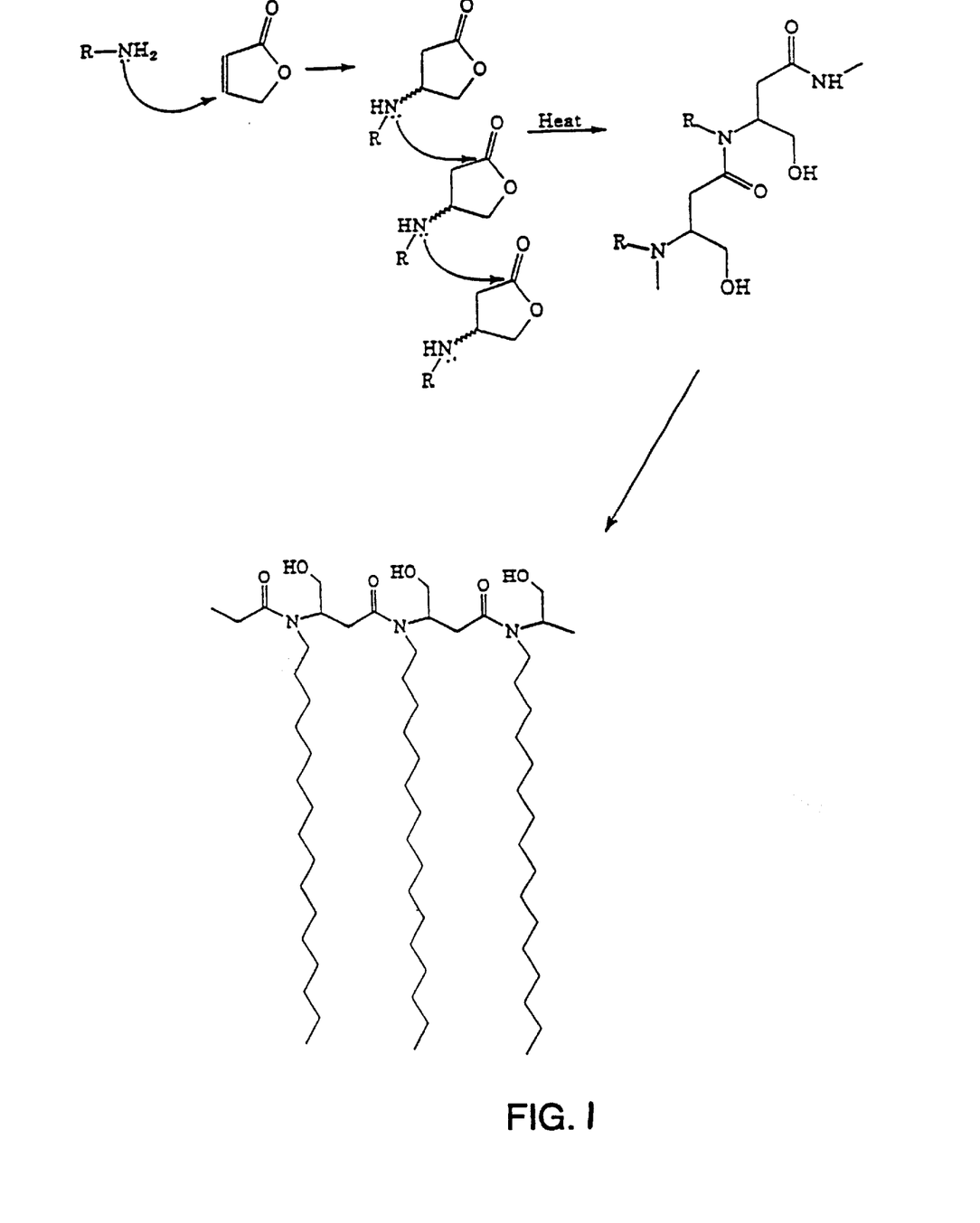
FIG. 1 shows a process for synthesizing a polyamide that is suitable for forming a crosslinked polyamide in accordance with the present invention.
Figure 2:
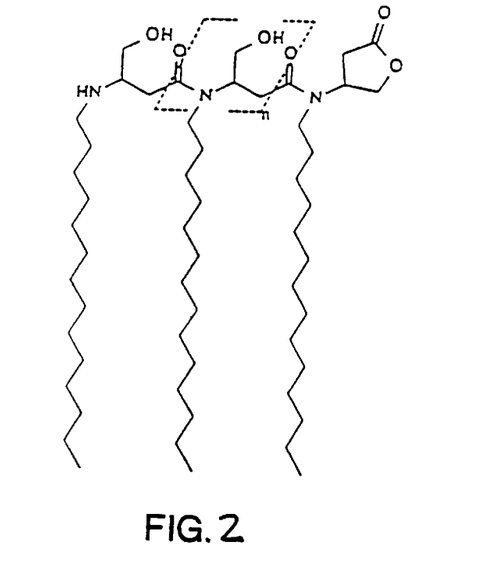
FIG. 2 shows a polyamide that is suitable for forming the crosslinked apolyamide in accordance with the present invention.
Figure 3:
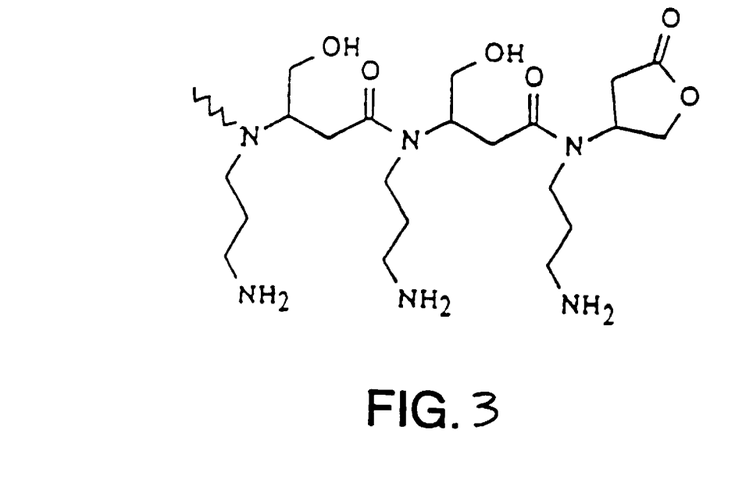
FIG. 3 shows a polyamide having amino groups that is suitable for forming the crosslinked polyamide in accordance with the present invention.

A procedure for making a crosslinked polyamide material in accordance with the invention involves reacting: (1) a polyamide of the formula:

wherein n is between about 50 and 10,000, wherein each R is between 1 and 50 carbon atoms alone and is optionally substituted with heteroatoms, oxygen, nitrogen, sulfur, or phosphorus and combinations thereof, and wherein multiples of the R are in vertically aligned spaced relationship along a backbone forming the polyamide with (2) a crosslinking agent containing at least two functional groups capable of reacting with the amino groups of the polyamide. The polyamide may be synthesized using the polymerization reactions disclosed in WO 00/17254, which are shown in FIG. 1. Looking at FIG. 1, it can be seen that the polyamide can be synthesized using an α,β-unsaturated gamma-lactone (such as 2(5H-furanone)) as an agent to effect the regular, sequential alignment of side chains along a polyamide backbone. The furanone undergoes facile reaction with a primary amine by Michael-type addition to yield α,β-amino gamma-lactone which then polymerizes to form a polyamide chain with the pendant side chain. Depending on the side group (R), the method can produce many different types of polyamides. For instance, when R is a saturated long-chain alkyl group (such as when the amine is tetradecylamine), a polymer having alkyl chains on one side of the polymer backbone and hydroxymethyl groups on the other side of the backbone is formed. See FIG. 2. When the R group is a polyamine (such as pentaethylenehexamine), a polymer having amino substituted alkyl chains on one side of the polymer backbone and hydroxymethyl groups on the other side of the backbone is formed. See FIG. 3.

It has been discovered that the polyamide of Formula (I) can be crosslinked using an isocyanate crosslinking agent. Suitable isocyanate crosslinking agents are monomeric or oligimeric molecules having 2 or more —N=C=O groups. Typically, the —N=C=O groups will crosslink the polyamide between both hydroxyl (—OH) groups and amino (—NH₂ or —NH—) groups on the polyamide. Polyisocyanate compounds useful for crosslinking the polyamide of Formula (I) include aliphatic and aromatic isocyanate compounds having an isocyanate functionality of at least 2. The polyisocyanate compounds can also contain other substituents which do not substantially adversely affect the reactivity of the —N=C=O groups during crosslinking of the polyamide of Formula (I). The polyisocyanate compound can also comprise mixtures of both aromatic and aliphatic isocyanates and isocyanate compounds having both aliphatic and aromatic character. Non-limiting examples of polyisocyanate crosslinking agents include ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane4,4'-diisocyanate, p-phenylene diisocyanate, m-phenylene diisocyanate, xylylene diisocyanate, 1,4-naphthalene diisocyanate, 1,5- naphthalene diisocyanate, diphenyl4,4'-diisocyanate, azobenzene4,41-diisocyanate, diphenylsulphone4,4'-diisocyanate, dichlorohexamethylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, tetramethylxylene diisocyanate, poly((phenylisocyanate)-co-formaldehyde) and mixtures thereof. The preferred isocyanate is poly(phenylisocyanate)co-formaldehyde). The amount of polyisocyanate and the amount of polyamide used in the crosslinking process can be varied depending upon the particular crosslinking agent utilized, the reaction conditions and the particular product application contemplated. Typically, the ratio of —N=C=O groups in the polyisocyanate to the total of amount of hydroxyl groups and amino groups in the polyamide can be varied to achieve a predetermined level of crosslinking. Typically, at least 4% of the polyisocyanate to the total amount of polyamide will provide acceptable crosslinking. In one version of the invention, enough polyisocyanate is added to the polyamide such that at least 15% of the available amino and hydroxyl groups in the polyamide are crosslinked by the —N=C=O groups in the polyisocyanate.

It has also been discovered that the polyamide of Formula (I) can be crosslinked using a polyaldehyde crosslinking agent. Suitable polyaldehyde crosslinking agents are monomeric or oligimeric molecules having 2 or more —CHO groups. Typically, the —CHO groups will crosslink the polyamide between amino groups on the polyamide. Polyaldehyde compounds useful for crosslinking the polyamide of Formula (I) include aliphatic and aromatic polyaldehyde compounds having a polyaldehyde functionality of at least 2. The polyaldehyde compounds can also contain other substituents which do not substantially adversely affect the reactivity of the —CHO groups during crosslinking of the polyamide of Formula (I). The polyaldehyde compound can also comprise mixtures of both aromatic and aliphatic polyaldehydes and polyaldehyde compounds having both aliphatic and aromatic character. Non-limiting examples of polyaldehyde crosslinking agents include glutaraldehyde, glyoxal, succinaldehyde, 2,6-pyridenedicarboxaldehyde, and 3-methyl glutaraldehyde. The amount of polyaldehyde and the amount of polyamide used in the crosslinking process can be varied depending upon the particular crosslinking agent utilized, the reaction conditions and the particular product application contemplated. Typically, the ratio of —CHO groups in the polyaldehyde to the total of amount of amino groups in the polyamide can be varied to achieve a predetermined level of crosslinking. Typically, the percentage of polyaldehyde to the total amount of amino groups in the polyamide is about 30% to provide acceptable crosslinking. In one version of the invention, enough polyaldehyde is added to the polyamide such that at least 30% of the available amino groups in the polyamide are crosslinked by the —CHO groups in the polyaldehyde.

It has also been discovered that the polyamide of Formula (I) can be crosslinked using a phosphine crosslinking agent having the general formula (A)$_2$P(B) and mixtures thereof, wherein A is hydroxyalkyl, and B is hydroxyalkyl, alkyl, or aryl. Typically, the A groups will crosslink the polyamide between amino groups on the polyamide to form a Mannich base type linkage —NH—CH$_2$—PRR$_1$, where R and R$_1$ are selected from hydroxy, methyl, hydroxyalkyl, alkyl and aryl groups. The phosphine crosslinking agent can also react with substrate to create tightly bound anchors between the polyamide coating and substrate. Non-limiting examples of phosphine crosslinking agents include tris(hydroxymethyl) phosphine, tris(1-hydroxyethyl)phosphine, tris(1-hydroxypropyl)phosphine, bis(hydroxymethyl)-alkylphosphine, and bis(hydroxymethyl)-arylphospine. The amount of phosphine crosslinking agent and the amount of polyamide used in the crosslinking process can be varied depending upon the particular crosslinking agent utilized, the reaction conditions and the particular product application contemplated. Typically, the ratio of A groups in the phosphine crosslinking agent to the total of amount of amino groups in the polyamide can be varied to achieve a predetermined level of crosslinking. Typically, the A groups in the phosphine crosslinking agent to the total of amount of amino groups in the polyamide is about 30% to provide acceptable crosslinking. In one version of the invention, enough phosphine crosslinking agent is added to the polyamide such that at least 30% of the available amino groups in the polyamide are crosslinked by the A groups in the phosphine crosslinking agent. This percentage or amount of phosphine crosslinker can be varied to obtain coatings with the desired crosslink density.

It has also been discovered that the polyamide of Formula (I) can be crosslinked using an epoxy crosslinking agent selected from epoxy resins having more than one epoxide group per molecule and mixtures thereof. A preferred epoxy crosslinking agent is selected from the group consisting of epoxy resins having end groups of the formula:

the end groups being directly attached to atoms of carbon, oxygen, nitrogen, sulfur or phosphorus, and mixtures thereof. For example, R may be bisphenol-A. Typically, the epoxy crosslinking agent will crosslink the polyamide between amino groups on the polyamide. The crosslinks are formed by attack at the epoxide rings by the amine proton which opens the epoxide ring forming an —OH group and forming a covalent crosslink between the amine (or amide) and the terminal epoxide carbon. Non-limiting examples of epoxy crosslinking agents include polyglycidyl ethers obtainable by reaction of a compound containing at least two free alcoholic hydroxyl and/or phenolic hydroxyl groups per molecule with epichlorohydrin under alkaline conditions. These polyglycidyl ethers may be made from acyclic alcohols, such as ethylene glycol, diethylene glycol, and higher poly(oxyethylene) glycols; from cycloaliphatic alcohols, such as cyclohexanol and 1,2-cyclohexanediol; from alcohols having aromatic nuclei, such as N,N-bis(2-hydroxyethyl)aniline; from mononuclear phenols, such as resorcinol and hydroquinone; and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, and 2,2,-bis(4-hydroxyphenyl)propane (otherwise known as bisphenol A). Most preferably, the epoxy crosslinking agent is a bisphenol-A glycidyl ether terminated s resin. The amount of epoxy crosslinking agent and the amount of polyamide used in the crosslinking process can be varied depending upon the particular crosslinking agent utilized, the reaction conditions and the particular product application contemplated. Typically, the ratio of epoxide groups in the epoxy crosslinking agent to the total of amount of amino groups in the polyamide can be varied to achieve a predetermined level of crosslinking. Typically, the epoxide groups in the epoxy crosslinking agent to the total of amount of amino groups in the polyamide is about 20% to provide acceptable crosslinking. In one version of the invention, enough epoxy crosslinking agent is added to the polyamide such that at least 20% of the available amino groups in the polyamide are crosslinked by the epoxide groups in the epoxy crosslinking agent. This percentage or amount of epoxy crosslinker can be varied to obtain coatings with the desired crosslink density for various applications. For instance, the polyamide coating can accept a non-thrombogenic coating formulation and can be loaded with metal powder to form a conducting coating for interconnect applications.

The polyamide of Formula (I) may be crosslinked using any of the above crosslinking agents by preparing a solution of the polyamide and adding the crosslinking agent to the solution. Typically, the polyamide may be dissolved using polar solvents, followed by addition of the crosslinking agent and other coating components to form a coating solution. Care is taken not to heat this solution as premature crosslinking is undesirable. In one version of the invention, the polyamide/crosslinking agent solution is applied to a substrate and the substrate is heated to complete the crosslinking process and create a crosslinked polyamide coating on the substrate.

In one particular application of the crosslinked polyamide material, a coating of the crosslinked polyamide is deposited on the surface of a substrate and the coating is further coated with an antithrombotic agent, such as heparin, to produce an article suitable for medical applications in which the article contacts blood. The crosslinked polyamide coating provides a secure bond that is not readily removed from the substrate, thereby assuring that the antithrombotic agent remains on the substrate and the substrate maintains its non-thrombogenic properties. In contrast, the polyamides disclosed in WO 00/17254 form a soft waxy coating on a substrate being coated. This soft waxy polyamide coating has a tendency to be readily removed from the substrate when contacted and under certain circumstances, the coating may become completely displaced from areas on the surface of the substrate being coated.

EXAMPLES

The following examples serve to further illustrate the invention. Examples 1, 1a, and 1b are comparative examples showing the properties of prior polyamide materials. Example 2 details the preparation of a polyamide suitable for use in the present invention. Examples 3, 3a, 3b and 3c illustrate the preparation and properties of a crosslinked polymer in accordance with the invention. Examples 4, 4a, 4b and 4c illustrate the preparation and properties of another crosslinked polymer in accordance with the invention. Examples 5, 5a, 5b and 5c illustrate the preparation and properties of yet another crosslinked polymer in accordance with the invention. Examples 6, 6a, 6b and 6c illustrate the preparation and properties of yet another crosslinked polymer in accordance with the invention. The examples are not intended to limit the invention in any way.

Example 1—Comparative Example

The procedure described in Example 16 of WO 00/17254 was used to produce a polyamide with mixed side chains. This polymer was produced by adding 1 molar equivalent of furanone (2(5H)-furanone) to 50 milliliters isopropanol, followed by adding 0.5 molar equivalents of tetradecylamine to the furanone solution dropwise. Once the tetradecylamine addition is complete, 0.25 molar equivalents of pentaethylenehexamine is added. The polymer produced had the mixed side chains and is suitable for making coatings. This polymer had a structure analogous to that shown in FIG. 3.

Example 1a—Comparative Example

The polymer prepared in Comparative Example 1 was dissolved in isopropanol and applied to a polypropylene substrate by dipping the substrate into the polymer solution. The substrate was dried without application of heat. Alternatively, the substrate may be dried with application of heat.

Example 1b—Comparative Example

The coated substrate prepared in Example 1a was subjected to the following test methods to determine the moisture and solvent resistance of the coating. The moisture resistance of the coating was tested using a test protocol that simulates the exposure of the coated substrate to moisture during a heparinization process. Fourier Transform-Infrared (FT-IR) analysis is used to assess the loss or lack of loss of the coating on the substrate. The solvent resistance of the coating was tested using the solvent double rub test from ASTM D4752 adapted by using isopropanol or acetone.

In the moisture resistance test, the coated substrate of Example 1a was soaked in an aqueous solution for 2 hours in an attempt to introduce heparin to the surface. A FT-IR analysis for heparin showed no heparin and no polyamide on the surface. The carbonyl bonds of the polyamide had completely disappeared (i.e., C=O at 1641 cm$^{-1}$ and C—N at 1580 cm$^{-1}$). in the solvent resistance test, the coating was easily and readily removed from the substrate.

Example 2

A crosslinkable polyamide suitable for use with the present invention was prepared as follows. A 12.7 gram sample of tetradecylamine and 10.0 grams of 2(5H)-furanone were added to a reaction vessel and gently heated at 30–40° C. until the amine dissolved into the 2(5H)-furanone and the solution became amber in color. The reaction vessel was removed from heat briefly to add 13.8 grams of pentaethylenehexamine. Immediately upon addition of the pentaethylenehexamine, the vessel was returned to heat where it was heated to 70° C. and maintained for four hours. The resulting polyamide was isolated either by precipitation into a non-solvent or by rotary evaporation. Size exclusion chromatography provided a typical weight average molecular weight of approximately 1,000,000 Daltons. FT-IR spectroscopy clearly resolved the amide carbonyl group at 1641 cm$^{-1}$ due to the reaction of the furanone ring with the amine and there was a complete loss of all carbon-carbon double bond stretching bands at 1600 cm$^{-1}$. The infrared data supported the full reaction of the furanone material with the amino functional monomers. The polymer included side chains having amino groups.

Example 3

The polyamide prepared in Example 2 was dissolved in toluene to 2 weight percent. Next, based upon the reaction stoichiometry, 0.5 grams poly(phenyl isocyanate)-co-formaldehyde) ($M_n$=340 Daltons) was added to react with approximately 18% of the available amine and hydroxyl groups formed in the polyamide during the polymerization reaction of Example 2. The isocyanate—polyamide crosslinking reaction was labile enough to proceed at room temperature causing most of the isocyanate to be consumed within one hour after addition of the isocyanate to the polyamide solution. Of course, any isocyanate functional material can be used to crosslink the polyamide to provide improved performance properties.

Example 3a

The polyamide solution prepared in Example 3 was applied as a coating to a polypropylene substrate and a polydimethylsiloxane substrate by dipping the substrate into the polyamide coating solution. (Although a dip coating process was used, it should be noted that dip coating is not the only way to apply the coating. One practiced in the art of coating application could find a number of alternative methods by which to apply this coating to the substrate.) The substrates having a crosslinked polyamide coating were then heated at 120° C. for 2 minutes to further crosslink the polymer. Baking the coated substrate will further improve the coating properties (e.g., 125° C. for 2–4 hours).

Example 3b

The coated substrates prepared in Example 3a were subjected to the moisture resistance and the solvent resistance tests described in Example 1a. The substrates of Example 3a did not exhibit any coating losses when subjected to the moisture resistance test, and exhibited no attack or minimal attack in the solvent resistance test. In contrast, the coating was easily and readily removed from the substrates of Comparative Example 1b.

Example 3c

The coated substrates prepared in Example 3a were further coated with heparin (a mucopolysaccharide known as a strong inhibitor of blood coagulation). The coated substrates were rinsed in a buffer (pH=5) for 15 minutes, followed by soaking for 1 hour in a 0.5% solution of heparin. The heparin content was assessed by toluidine blue analysis. The isocyanate crosslinked polyamide and heparin coated substrates were then subjected to a clotting test to determine the ability of a substrate coated with the isocyanate crosslinked polyamide and heparin to maintain non-thrombogenic properties. It was discovered that a substrate coated with an inner coat of a polyamide crosslinked with isocyanate and an outer coat of heparin did not maintain non-thrombogenic properties at room temperature and humidity. This is likely caused by the isocyanate consuming free —NH groups that the heparin required for binding.

Example 4

A sample of the polymer prepared in Example 2 was dissolved in isopropyl alcohol to produce a 2% solution of the polymer. Once the polymer was dissolved, enough 50% aqueous glutaraldehyde was added to make the solution 0.5 to 1% in glutaraldehyde. The solution was stirred to allow full dissolution and mixing of the glutaraldehyde.

Example 4a

The polymer-glutaraldehyde solution prepared in Example 4 was applied as a coating to a polypropylene substrate and a polydimethylsiloxane substrate by dipping the substrate into the polyamide coating solution. (Although a dip coating process was used, it should be noted that any number of ways that will effectively deliver the coating to substrate surface including spray, HVLP spray, and rolling.) Excess solvent was removed by blotting the bottom edge of the substrates. The coated substrates were heat cured at 120–150° C. for 1 minute to crosslink the polymer.

The glutaraldehyde crosslinked the polymer through a mechanism that creates a Schiff base between the polymer and glutaraldehyde. Depending upon the surface pretreatment of the substrate, the glutaraldehyde can act as an anchor between the substrate surface treatment and the polymer coating.

Example 4b

The coated substrates prepared in Example 4a were subjected to the moisture resistance and the solvent resistance tests described in Example 1a. The substrates of Example 4a did not exhibit any coating losses when subjected to the moisture resistance test, and exhibited no attack or minimal attack in the solvent resistance test. The coating provided outstanding film properties since it could not be readily removed from the substrate. However, at low pH (e.g., pH=3 or lower), the coating was compromised.

Example 4c

The coated substrates prepared in Example 4a were further coated with heparin using the heparin coating process described in Example 3c. The glutaraldehyde crosslinked polyamide and heparin coated substrates were then subjected to a toluidine blue analysis to determine the actual amount of heparin on the substrate. A clotting test demonstrated that the substrates coated with the glutaraldehyde crosslinked polyamide and heparin maintained non-thrombogenic properties. It was discovered that a substrate coated with an inner coat of a polyamide crosslinked with glutaraldehyde and an outer coat of heparin maintained non-thrombogenic properties for longer periods of time. However, under certain highly acidic conditions, the polymer tended to hydrolyze.

Example 5

A 1.0 gram sample of the polymer prepared in Example 3 was dissolved in 50 milliliters of isopropanol to produce a polymer solution. To this polymer solution, 50 microliters acetic acid and 260 microliters (approximately 340 milligrams) of tris(hydroxymethyl)phosphine, $(CH_2OH)_3P$, (which can be synthesized using standard methods from the literature) were added. The polymer—tris(hydroxymethyl) phosphine solution was allowed to stir for several minutes to effect complete mixing. Any precipitate was filtered to from a clear coating solution. In an alternative procedure, tetrakis (hydroxymethyl) phosphonium chloride was substituted for the tris(hydroxymethyl)phosphine in the polymer solution which was then heated to liberate the tris(hydroxymethyl) phosphine in situ for the reaction. The tetrakis (hydroxymethyl) phosphonium chloride substitution was found to be particularly advantageous in that tris (hydroxymethyl)phosphine, $(CH_2OH)_3P$ is extremely reactive and provides a relatively short pot life whereas tetrakis (hydroxymethyl) phosphonium chloride provides a relatively non-reactive starting material that has a significantly longer pot life (12 to 24 hours) and that does not require filtration.

Example 5a

The polymer solution prepared in Example 5 was then applied as a coating to a polypropylene substrate and a polydimethylsiloxane substrate by dipping the substrate into the polyamide coating solution and removing the substrates from the polymer solution. (Although a dip coating process was used, it should be noted that any number of ways that will effectively deliver the coating to substrate surface including spray, HVLP spray, and rolling.) Excess solvent was removed by blotting the bottom edge of the substrates. The coated substrates were heat cured to 120° C. for 2 minutes to crosslink the polymer.

The tris(hydroxymethyl)phosphine crosslinked the polymer through a reaction between the CH$_2$OH groups of the tris(hydroxymethyl)phosphine and the amino groups of the polymer to form a Mannich base type linkage —NH—CH$_2$—PRR$_1$. It is also contemplated that depending upon the surface pretreatment of the substrate, the tris (hydroxymethyl)phosphine can act as an anchor between the substrate surface and the polymer coating.

Example 5b

The coated substrates prepared in Example 5a were subjected to the moisture resistance and the solvent resistance tests described in Example 1a. The substrates of Example 5a did not exhibit any coating losses when subjected to the moisture resistance test, and exhibited no attack in the solvent resistance test.

Example 5c

The coated substrates prepared in Example 5a were further coated with heparin using the heparin coating process described in Example 3c. The tris(hydroxymethyl) phosphine crosslinked polyamide and heparin coated substrates were then subjected to a toluidine blue analysis to determine the actual amount of heparin on the substrate. A clotting test demonstrated that the tris(hydroxymethyl) phosphine crosslinked polyamide and heparin coated substrates maintained non-thrombogenic properties. It was discovered that a substrate coated with an inner coat of a polyamide crosslinked with tris(hydroxymethyl)phosphine and an outer coat of heparin maintained non-thrombogenic properties and was stable in acidic conditions. Accordingly, a substrate coated with an inner coat of a polyamide crosslinked with tris(hydroxymethyl)phosphine and an outer coat of heparin would be suitable for medical applications where the substrate contacts blood and operates in an acidic environment (e.g., endotracheal tubes exposed to stomach acid).

Example 6

A one gram sample of the polymer prepared in Example 3 was dissolved in 50 milliliters isopropanol to produce a solution. Once the polymer was dissolved, 1.0 milliliter of 50% w/w glutaraldehyde, 1.0 milliliter of triethylamine and 0.5 grams of a bisphenol-A glycidyl ether terminated resin (commercially available from Aldrich Chemical with M$_n$=340 Daltons) were mixed into the polymer solution. The polymer solution was allowed to mix for several minutes to effect complete mixing.

Example 6a

The polymer-bisphenol-A glycidyl ether terminated resin solution prepared in Example 6 was then applied as a coating to a polypropylene substrate by dipping the substrate into the polyamide coating solution and removing the substrate from the solution. A polydimethylsiloxane substrate was also pretreated with a pretreatment solution containing 50 ml. isopropanol, 0.1–0.2 ml. glacial acetic acid and 1 milliliter 3-[2-(2-aminoethylamino)ethylamino]propyltrimethoxy silane. The pretreated polydimethylsiloxane substrate was dipped into the polyamide coating solution and removed.

(Although a dip coating process was used, it should be noted that any number of ways that will effectively deliver the coating to substrate surface including spray, HVLP spray, and rolling.) The s substrates were heat dried with a heat gun and baked at 125° C. for 1 hour to crosslink the polymer.

Example 6b

The coated substrates prepared in Example 6a were immersed in boiling water for 30 minutes. The substrates of Example 6a were found to be stable in the boiling water by FT-IR.

Example 6c

The coated substrates prepared in Example 6a were further coated with heparin using the heparin coating process described in Example 3c. The epoxy crosslinked polyamide and heparin coated substrates were then subjected to a toluidine blue analysis to determine the actual amount of heparin on the substrate. A clotting test demonstrated that the epoxy crosslinked polyamide and heparin coated substrates maintained non-thrombogenic properties. It was discovered that a substrate coated with an inner coat of a polyamide crosslinked with epoxy and an outer coat of heparin maintained non-thrombogenic properties.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A polyamide material comprising a crosslinked chemical combination of
a polyamide of the formula:

wherein n is between about 50 and 10,000, wherein each R is between 1 and 50 carbon atoms alone and is optionally substituted with heteroatoms, oxygen, nitrogen, sulfur, or phosphorus and combinations thereof, wherein multiple of the R are in vertically aligned spaced relationship along a backbone forming the polyamide, and wherein two or more of the R contain an amino group; and
a crosslinking agent containing at least two functional groups capable of reacting with the amino groups.

2. The polyamide material of claim 1 wherein:
the crosslinking agent is selected from the group consisting of aliphatic isocyanate compounds having 2 or more —N=C=O groups, aromatic isocyanate compounds having 2 or more —N=C=O groups, and mixtures thereof.

3. The polyamide material of claim 2 wherein:
the crosslinking agent is poly(phenyl isocyanate)co-formaldehyde).

4. The polyamide material of claim 2 wherein:

the crosslinking agent is added in a reaction stoichiometry such that the crosslinking agent reacts with at least 15% of the hydroxyl and amino groups of the polyamide.

5. The polyamide material of claim 1 wherein:

the crosslinking agent is selected from the group consisting of aliphatic aldehyde compounds having 2 or more —CHO groups, aromatic aldehyde compounds having 2 or more —CHO groups, and mixtures thereof.

6. The polyamide material of claim 5 wherein:

the crosslinking agent is glutaraldehyde.

7. The polyamide material of claim 5 wherein:

the crosslinking agent is added in a reaction stochiometry such that the crosslinking agent reacts with at least 30% of the amino groups of the polyamide.

8. The polyamide material of claim 1 wherein:

the crosslinking agent is selected from the group consisting of phosphines having the general formula $(A)_2P(B)$ and mixtures thereof, wherein A is hydroxyalkyl, and B is hydroxyalkyl, alkyl, or aryl.

9. The polyamide material of claim 8 wherein:

the crosslinking agent is tris(hydroxymethyl)phosphine.

10. The polyamide material of claim 9 wherein:

the polyamide material is stable in acidic conditions.

11. The polyamide material of claim 8 wherein:

the crosslinking agent is added in a reaction stochiometry such that the crosslinking agent reacts with at least 30% of the amino groups of the polyamide.

12. The polyamide material of claim 1 wherein:

the crosslinking agent is selected from the group consisting of epoxy resins having more than one epoxide group per molecule, and mixtures thereof.

13. The polyamide material of claim 12 wherein:

the crosslinking agent is selected from the group consisting of epoxy resins having end groups of the formula:

the end groups being directly attached to atoms of carbon, oxygen, nitrogen, sulfur or phosphorus, and mixtures thereof.

14. The polyamide material of claim 13 wherein:

the crosslinking agent is a bisphenol-A glycidyl ether terminated resin.

15. The polyamide material of claim 12 wherein:

the crosslinking agent is added in a reaction stochiometry such that the crosslinking agent reacts with at least 20% of the amino groups of the polyamide.

16. A polyamide material comprising a crosslinked chemical combination of a polyamide of the formula:

wherein n is between about 50 and 10,000, wherein each R is between 1 and 50 carbon atoms alone and is optionally substituted with heteroatoms, oxygen, nitrogen, sulfur, or phosphorus and combinations thereof, and wherein multiple of the R are in vertically aligned spaced relationship along a backbone forming the polyamide; and a crosslinking agent containing at least two functional groups capable of reacting with hydroxyl groups.

17. The polyamide material of claim 16 wherein:

the crosslinking agent is selected from the group consisting of aliphatic isocyanate compounds having 2 or more —N=C=O groups, aromatic isocyanate compounds having 2 or more —N=C=O groups, and mixtures thereof.

18. The polyamide material of claim 17 wherein:

the crosslinking agent is poly(phenyl isocyanate)co-formaldehyde).

19. A polyamide coated article comprising:

a substrate; and a coating of the polyamide material of claim 1 bonded to the substrate.

20. The article of claim 19 wherein:

the substrate is a natural or synthetic polymeric substrate.

21. The article of claim 20 wherein:

the polymeric substrate comprises a material selected from cellulose, polyethylene, polypropylene, polyvinyl chloride, polyurethane, silicone rubber, or polytetrafluoroethylene.

22. The article of claim 19 further comprising:

an antithrombotic agent bonded to the coating.

23. The article of claim 22 wherein:

the antithrombotic agent is heparin.

24. A process for preparing a crosslinked polyamide material, the process comprising:

providing a polyamide of the formula:

wherein n is between about 50 and 10,000, wherein each R is between 1 and 50 carbon atoms alone and is optionally substituted with heteroatoms, oxygen, nitrogen, sulfur, or phosphorus and combinations thereof, and wherein multiple of the R are in vertically aligned spaced relationship along a backbone forming the polyamide; and mixing the polyamide with a crosslinking agent containing at least two functional groups capable of reacting with the amino groups.

25. The process of claim 24 wherein:

the crosslinking agent is selected from the group consisting of aliphatic isocyanate compounds having 2 or more —N=C=O groups, aromatic isocyanate compounds having 2 or more —N=C=O groups, and mixtures thereof.

26. The process of claim 24 wherein:

the crosslinking agent is selected from the group consisting of aliphatic aldehyde compounds having 2 or more —CHO groups, aromatic aldehyde compounds having 2 or more —CHO groups, and mixtures thereof.

27. The process of claim 24 wherein:

the crosslinking agent is selected from the group consisting of phosphines having the general formula $(A)_2P(B)$ and mixtures thereof, wherein A is hydroxyalkyl, and B is hydroxyalkyl, alkyl, or aryl.

28. The process of claim 24 wherein:

the crosslinking agent is selected from the group consisting of epoxy resins having end groups of the formula:

the end groups being directly attached to atoms of carbon, oxygen, nitrogen, sulfur or phosphorus, and mixtures thereof.

29. A process for preparing a crosslinked polyamide material, the process comprising:

providing a polyamide of the formula:

wherein n is between about 50 and 10,000, wherein each R is between 1 and 50 carbon atoms alone and is optionally substituted with heteroatoms, oxygen, nitrogen, sulfur, or phosphorus and combinations thereof, wherein multiple of the R are In vertically aligned spaced relationship along a backbone forming the polyamide, and wherein two or more of the R contain an amino group; and mixing the polyamide with a crosslinking agent containing at least two functional groups capable of reacting with hydroxyl groups.

30. The process of claim 29 wherein:

the crosslinking agent is selected from the group consisting of aliphatic isocyanate compounds having 2 or more —N=C=O groups, aromatic isocyanate compounds having 2 or more —N=C=O groups, and mixtures thereof.

31. A process for rendering the surface of a substrate antithrombogenic, the process comprising:

providing a polyamide of the formula:

wherein n is between about 50 and 10,000, wherein each R is between 1 and 50 carbon atoms alone and is optionally substituted with heteroatoms, oxygen, nitrogen, sulfur, or phosphorus and combinations thereof, and wherein multiple of the R are in vertically aligned spaced relationship along a backbone forming the polyamide;

mixing the polyamide with a crosslinking agent to produce a polyamide solution, the crosslinking agent containing at least two functional groups capable of reacting with the amino groups;

providing a substrate;

coating at least a portion of the substrate with the polyamide solution;

applying heat to the substrate to produce a crosslinked polyamide coating on the substrate; and coating at least a portion of the crosslinked polyamide on the substrate with an antithrombotic agent.

32. The process of claim 31 wherein:

the antithrombotic agent is heparin.

33. The process of claim 31 wherein:

the crosslinking agent is selected from the group consisting of aliphatic isocyanate compounds having 2 or more —N=C=O groups, aromatic isocyanate compounds having 2 or more —N=C=O groups, and mixtures thereof.

34. The process of claim 31 wherein:

the crosslinking agent is selected from the group consisting of aliphatic aldehyde compounds having 2 or more —CHO groups, aromatic aldehyde compounds having 2 or more —CHO groups, and mixtures thereof.

35. The process of claim 31 wherein:

the crosslinking agent is selected from the group consisting of phosphines having the general formula $(A)_2P(B)$ and mixtures thereof, wherein A is hydroxyalkyl, and B is hydroxyalkyl, alkyl, or aryl.

36. The process of claim 31 wherein:

the crosslinking agent is selected from the group consisting of epoxy resins having end groups of the formula:

the end groups being directly attached to atoms of carbon, oxygen, nitrogen, sulfur or phosphorus, and mixtures thereof.

* * * * *

UNITED STATES PATENT AND TRADEMARK OFFICE
CERTIFICATE OF CORRECTION

PATENT NO.     : 6,399,714 B1                                                                Page 1 of 1
DATED          : June 4, 2002
INVENTOR(S)    : William F. McDonald, Stacy C. Wright and Andrew C. Taylor It is certified that error appears in the above-identified patent and that said Letters Patent is hereby corrected as shown below:

<u>Column 1,</u>
Line 2, please add:
-- STATEMENT REGARDING FEDERALLY SPONSORED RESEARCH OR DEVELOPMENT
    This invention was made with Government support under NREL Subcontract No. XXE-9-29058-01, Prime Contract No. DE-AC36-98GO10337 awarded by the Department of Energy. The Government has certain rights in this invention. --

Signed and Sealed this

Fifteenth Day of July, 2003

JAMES E. ROGAN
*Director of the United States Patent and Trademark Office*